C. W. BROWN.
KINDLING DEVICE.
APPLICATION FILED APR. 15, 1912.
1,044,131.
Patented Nov. 12, 1912.
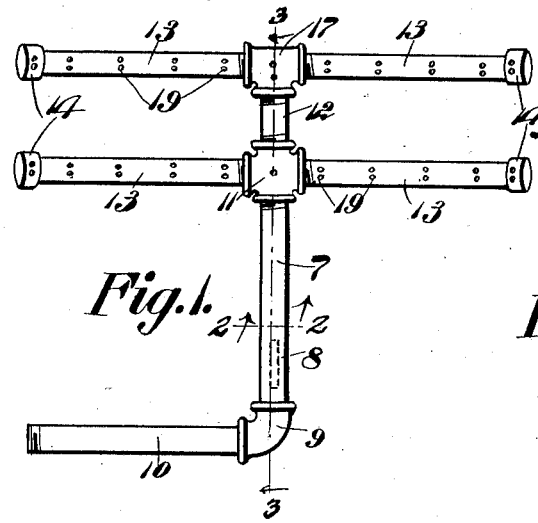
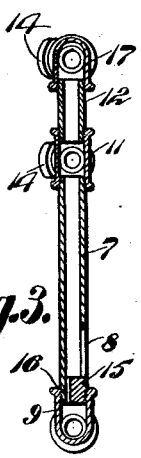
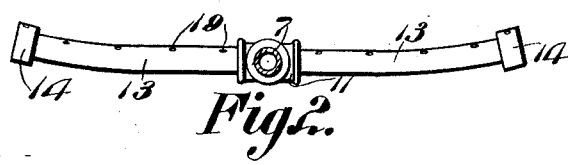
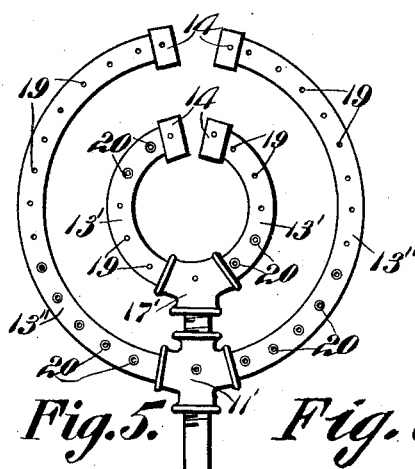
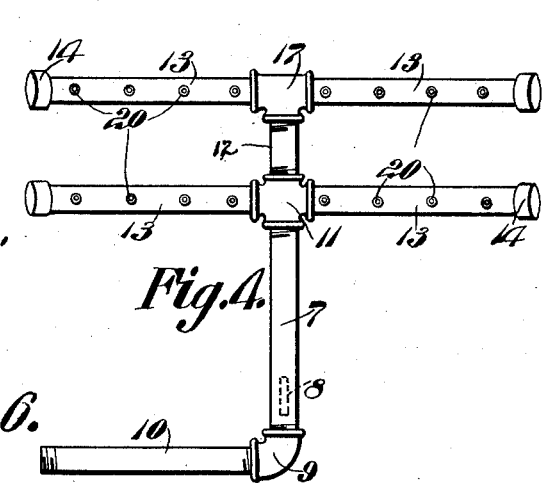
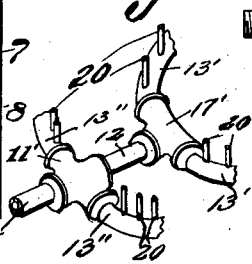
Witnesses
Charles W. Brown,
Inventor
by
Attorneys

UNITED STATES PATENT OFFICE.

CHARLES W. BROWN, OF JOHNSTOWN, PENNSYLVANIA.

KINDLING DEVICE.

1,044,131. Specification of Letters Patent. Patented Nov. 12, 1912.

Application filed April 15, 1912. Serial No. 690,817.

*To all whom it may concern:*

Be it known that I, CHARLES W. BROWN, a citizen of the United States, residing at Johnstown, in the county of Cambria and State of Pennsylvania, have invented a new and useful Kindling Device, of which the following is a specification.

This invention relates to kindling devices, and has for its object to provide a burner adapted to be projected under or outside the grate of a cooking stove, heating stove, furnace, boiler or the like, in order to kindle or start the coal or other fuel contained within the fire box.

Another object of the present invention is to provide a device of this character which shall be simple in construction, inexpensive to manufacture, and which shall be convenient and efficient in its use.

With the above and other objects in view, which will be apparent as the invention is better understood, this invention resides in the novel construction and combination of parts hereinafter described and particularly pointed out in the claims, reference being had to the accompanying drawings wherein the invention is illustrated in its preferred embodiment, and wherein:—

Figure 1 is a plan view of one form of the invention. Figs. 2 and 3 are sectional views taken on the lines 2—2 and 3—3 of Fig. 1, respectively. Fig. 4 is a plan view of a modified form somewhat similar to the form shown in Fig. 1. Fig. 5 is a plan view of another form of the invention. Fig. 6 is a fragmental perspective view of the form shown in Fig. 5.

Referring specifically to the drawings, the form shown in Figs. 1, 2 and 3 embodies the mixing tube or pipe 7, a cruciform coupling 11 having one arm attached to the end thereof, a short pipe section 12 attached to the opposite arm of the coupling, a T-coupling 17 attached to the short pipe section 12, and perforated pipe sections 13 attached to the lateral arms of the said couplings and having their free ends closed. The mixing tube or pipe 7 is provided at its outer end with an elongated inlet 8 and a plug 15 fits within the outer end of the mixing tube to a point adjacent the outer end of the inlet 8, this plug 15 being provided with a channel or duct 16 therein opposite the inlet 8. The mixing tube or pipe 7 is connected with a supply pipe 10 by means of an elbow 9, this supply pipe being connected to a supply of gas by means of suitable piping or tubing. The gas passing through the supply pipe 10 is forced through the channel or duct 16 to emit in a jet into the mixing tube or pipe 7, air being drawn through the inlet 8 causing the air to be mixed with the gas in order to form the proper mixture for producing perfect combustion of the fuel. The outer or free ends of the pipe sections 13 are closed by means of caps 14, and the pipe sections 13 are provided with a double row of apertures or outlet orifices 19, the caps 14 and the couplings 11 and 17 also being preferably provided with apertures or outlet orifices. The orifices of the various parts are arranged upwardly and the fuel is discharged therethrough to provide the flames. The outer or free ends of the pipe sections 13 are also turned or bent upwardly, as best seen in Fig. 2.

The structure shown in Fig. 4 is similar to the form shown in Fig. 1, with the exception that a plurality of small tubes or nozzles 20 are engaged in the discharge apertures or outlets in the pipe section 13, the fuel being adapted to pass through the said tubes or nozzles.

In the form shown in Fig. 5, the short and long pipe sections 13' and 13", respectively, and the lateral arms of the respective cruciform coupling 11' and the T-coupling 17' to which they are attached are curved about a point beyond the T-coupling as a center, so that the free ends of the corresponding pipe sections 13' and 13" are arranged close together. The pipe sections 13' attached to the T-coupling 17' are necessarily shorter than the pipe sections 13" attached to the cruciform coupling 11', and the two sets of pipe sections form rings which are concentric. In this form, the discharge tubes or nozzles 20 may also be engaged in the outlet apertures or orifices 19, if desired.

In use, the burner is adapted to be inserted or projected under the grate of the stove, furnace, or the like, and the flames emitting from the burner are adapted to kindle or start the combustion of the coal or other fuel over the grate, fuel being supplied to the mixing tube or pipe 7 in any convenient manner. After the fire has kindled, the burner may be withdrawn, or if the burner is held in a stationary position beneath the grate, the supply of fuel may be shut off, permitting the combustion of the fuel in the grate in the ordinary manner. The small tubes or nozzles are provided especially for thick grates in order that the tubes or nozzles may pass between the grate bars to cause the flame to come in contact with the coal or other fuel in the grate. The forms shown in Figs. 1 and 4 are adapted for rectangular grates, whereas the form shown in Fig. 5 is adapted particularly for circular grates, it being understood that this burner may be constructed in various forms, sizes and proportions, to accommodate various grates, and may be otherwise altered in its details within the scope of the appended claims without departing from the spirit of the invention.

A kindling device constructed in accordance with the present invention is simple, durable, and inexpensive, and in its use is both convenient and efficient. This burner is adapted particularly to be placed outside of the grate to throw the flames through the grate for igniting the fuel on the grate and is therefore out of contact with the fuel on the grate so that the discharge outlets or apertures will not become clogged. This burner is also adapted to ignite the coal or other fuel completely throughout the portions thereof resting against the grate in order that the coal or other fuel will be thoroughly kindled.

Having described the invention, what is claimed as new is:—

1. A kindling device embodying a pipe, and a plurality of pairs of perforated pipe sections attached to said pipe and curved about a point beyond the end of the pipe so that the free ends of the corresponding pipe sections are arranged close together, the free ends of the pipe sections being closed.

2. A kindling device embodying a mixing pipe, a cruciform coupling having one arm attached to the end thereof, a short pipe section attached to the opposite arm of the coupling, a T-coupling attached to the short pipe section, and perforated pipe sections attached to the lateral arms of the couplings and having their free ends closed.

3. A kindling device embodying a mixing pipe, a cruciform coupling having one arm attached to the end thereof, a short pipe section attached to the opposite arm of the coupling, a T-coupling attached to the short pipe section, and perforated pipe sections attached to the lateral arms of the couplings and having their free ends closed, the lateral arms of the couplings and the perforated pipe sections being curved about a point beyond the T-coupling as a center so that the free ends of the corresponding pipe sections are arranged close together.

4. A kindling device embodying a mixing pipe, a cruciform coupling having one arm attached to the end thereof, a short pipe section attached to the opposite arm of the coupling, a T-coupling attached to the short pipe section, perforated pipe sections attached to the lateral arms of the couplings and having their free ends closed, and discharge tubes engaged in the perforations in the pipe sections.

In testimony that I claim the foregoing as my own, I have hereto affixed my signature in the presence of two witnesses.

CHARLES W. BROWN.

Witnesses:
 FRANK MAKIN,
 F. D. WERRY.

---

Copies of this patent may be obtained for five cents each, by addressing the "Commissioner of Patents, Washington, D. C."